United States Patent
Ho et al.

(10) Patent No.: US 8,463,198 B2
(45) Date of Patent: Jun. 11, 2013

(54) SIGNAL PROCESSING METHOD AND COMMUNICATION APPARATUS UTILIZING THE SAME

(75) Inventors: Yuan Ho, Kaohsiung (TW); Wei-Sheng Yin, Hsinchu County (TW); Jeng-Yi Tsai, Kaohsiung (TW); I-Ping Chang, Tainan (TW); Keng-Ming Huang, Taipei (TW); Chia-Chen Hsu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 574 days.

(21) Appl. No.: 12/503,110

(22) Filed: Jul. 15, 2009

(65) Prior Publication Data

US 2011/0014906 A1    Jan. 20, 2011

(51) Int. Cl.
*H04B 1/00*        (2006.01)
*H04B 7/00*        (2006.01)

(52) U.S. Cl.
USPC ............................................ 455/70; 455/522

(58) Field of Classification Search
USPC ............... 455/432.2, 432.3, 436, 522, 67.11, 455/67.7, 70
See application file for complete search history.

(56) References Cited

U.S. PATENT DOCUMENTS

| | | | |
|---|---|---|---|
| 6,987,738 B2 * | 1/2006 | Subramanian et al. | 370/252 |
| 8,031,807 B2 | 10/2011 | Shellhammer | |
| 2009/0059871 A1 * | 3/2009 | Nader et al. | 370/337 |
| 2009/0156196 A1 * | 6/2009 | Somasundaram et al. | 455/423 |
| 2009/0270103 A1 * | 10/2009 | Pani et al. | 455/436 |
| 2010/0120429 A1 * | 5/2010 | Kazmi et al. | 455/436 |

FOREIGN PATENT DOCUMENTS

| | | |
|---|---|---|
| EP | 1548973 | 6/2005 |
| TW | 200830749 | 1/2006 |

* cited by examiner

*Primary Examiner* — Ping Hsieh
(74) *Attorney, Agent, or Firm* — McClure, Qualey & Rodack, LLP

(57) ABSTRACT

A communication apparatus is provided. A processor receives a measurement control message carrying information about a filtering coefficient via a radio transceiver module, periodically measures signal quality of at least one cell to obtain a plurality of measurement results, periodically filters the measurement results according to a first measurement period to obtain a plurality of filtered results, and determines whether to transmit a measurement report to a system controller in the wireless communication network according to the filtered results. The filtering coefficient is assigned by the system controller to filter the measurement results according to a second measurement period. The second measurement period is longer than the first measurement period

17 Claims, 3 Drawing Sheets

SIGNAL PROCESSING METHOD AND COMMUNICATION APPARATUS UTILIZING THE SAME

BACKGROUND OF THE INVENTION

1. Field of the Invention

The invention relates to power measurement and reporting in a wireless communication system, and more particularly to a signal processing method to reduce active set update latency.

2. Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communication is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and -defined cellular communication technologies. For example, the Global System for Mobile communications (GSM) communication system is a well-defined and commonly adopted communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5G/3G (generation) technology standard that uses code division multiple access (CDMA) technology. The UMTS communication system (Universal Mobile Telecommunications System) is a 3G mobile communications system, which provides an enhanced range of multimedia services over the GSM system.

BRIEF SUMMARY OF THE INVENTION

Communication apparatus and signal processing method are provided. An embodiment of a communication apparatus comprises a radio transceiver module and a processor. The processor receives a measurement control message carrying information about a filtering coefficient via the radio transceiver module, measures signal quality of at least one cell to obtain a plurality of measurement results, periodically filters the measurement results according to a first measurement period to obtain a plurality of filtered results, and determines whether to transmit a measurement report to a system controller in the wireless communication network according to the filtered results. The filtering coefficient is assigned by the system controller to filter the measurement results according to a second measurement period, and the second measurement period is longer than the first measurement period.

An embodiment of a signal processing method comprises obtaining a filtering coefficient; measuring signal quality of at least one cell to obtain a plurality of measurement results; periodically filtering the measurement results according to a first measurement period to obtain a plurality of filtered results; and determining whether to transmit a measurement report to a system controller in a wireless communication network according to the filtered results. The filtering coefficient is assigned by the system controller to filter the measurement results according to a second measurement period, and the second measurement period is longer than the first measurement period.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
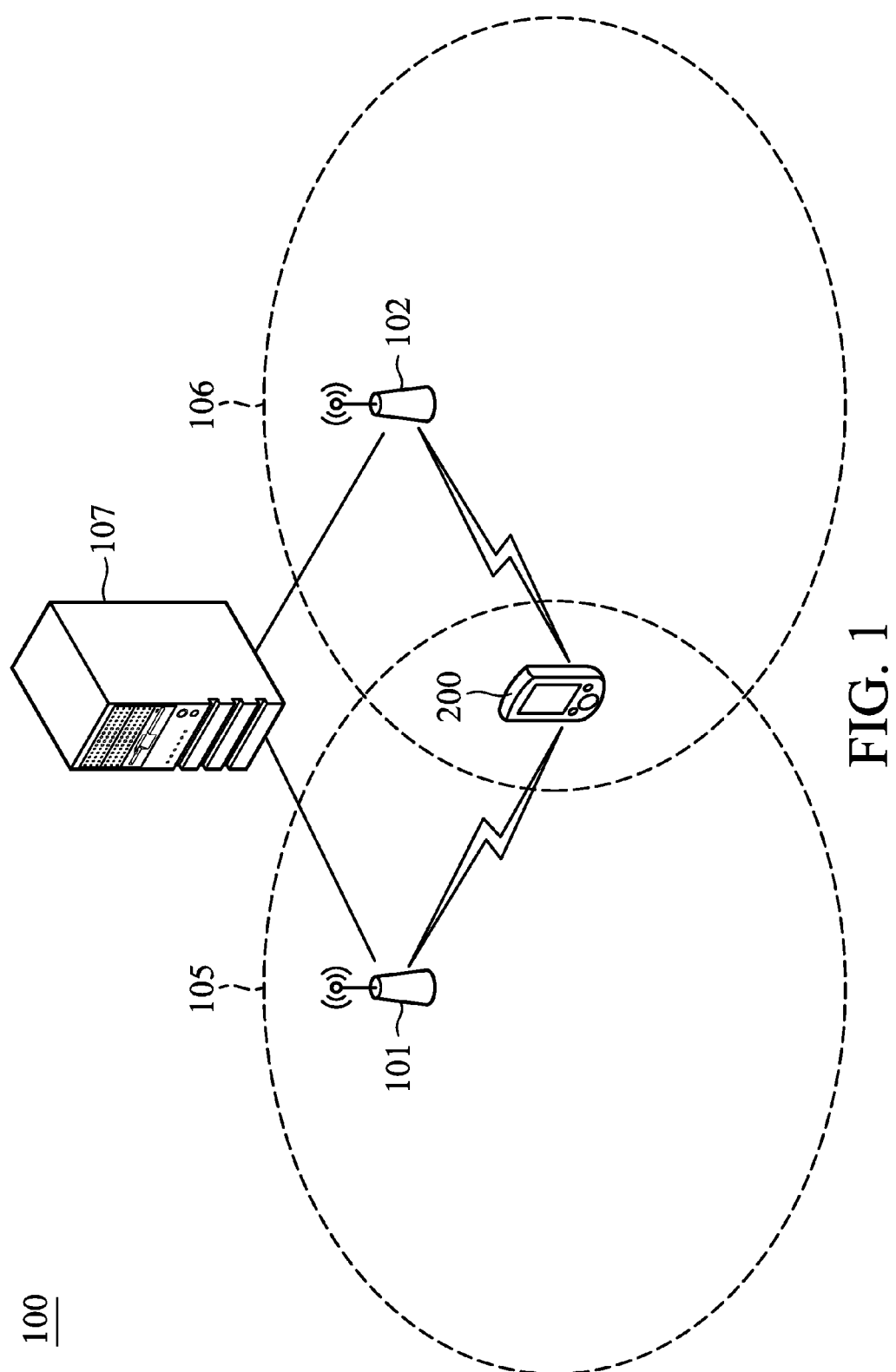
FIG. 1 shows an exemplary network topology of a wireless communication system according to an embodiment of the invention.

FIG. 1 shows an exemplary network topology of a wireless communication system according to an embodiment of the invention. As shown in FIG. 1, the wireless communication system 100 comprises one or more Base Stations (BS) (or called Node-Bs) 101 and 102 in one or more zones 105 and 106 that receive, transmit, repeat, or others, wireless communication signals and provide services to each other and/or to one or more communication apparatus 200. The wireless communication system 100 further comprises one or more network device 107 in the backbone network and acts as a system controller to communicate with the BSs to provide and maintain services for the BSs. According to an embodiment of the invention, the communication apparatus may be a personal computer, a lap-top computer, a notebook, a mobile phone, a cell phone, a personal digital assistant (PDA), or others, and is generally referred to a Mobile Station (MS). Thus, the invention should not be limited thereto. BSs 101 and 102 may be connected to an infrastructure network (e.g. the Internet) and, therefore, provide connectivity to the Internet. The network device 107 may be a Radio Network Control (RNC) responsible for controlling the BSs (Node-Bs) that are connected to it.

Figure 2:
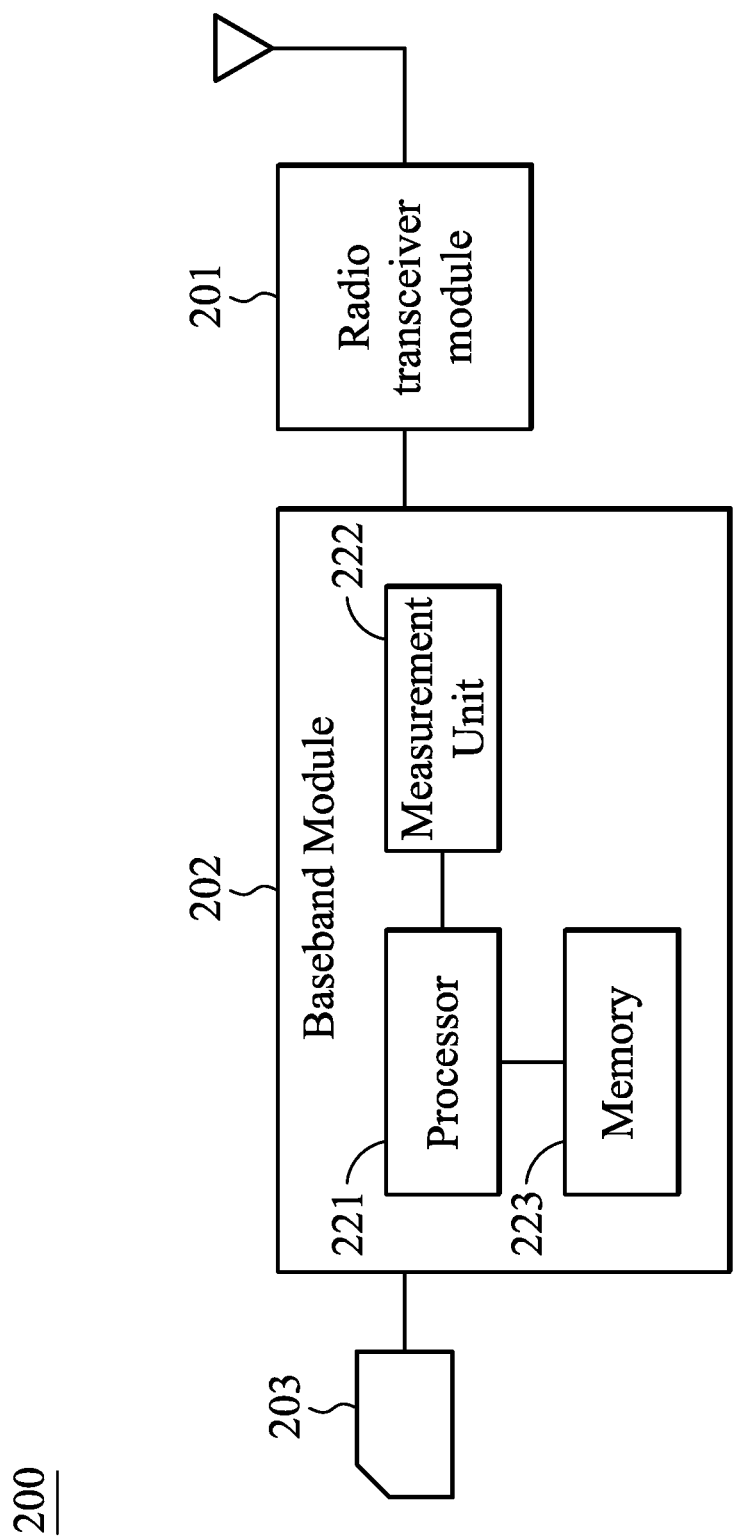
FIG. 2 shows a schematic view of a communication apparatus according to an embodiment of the invention.

FIG. 2 shows a schematic view of a communication apparatus according to an embodiment of the invention. The communication apparatus 200 may comprise a radio transceiver module 201, a baseband module 202, and selectively comprise a subscriber identity card 203. The radio transceiver module 201 receives wireless radio frequency signals, converts the received signals to baseband signals to be processed by the baseband module 202, or receives baseband signals from the baseband module 202 and converts the received signals to wireless radio frequency signals to be transmitted to a peer communication device. The radio transceiver module 201 may comprise a plurality of hardware devices to perform radio frequency conversion. For example, the radio transceiver module 201 may comprise a mixer to multiply the baseband signals with a carrier oscillated at the radio frequency of the wireless communication system. The baseband module 202 further converts the baseband signals to a plurality of digital signals, and processes the digital signals, and vice versa. The baseband module 202 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 202 may comprise a processor 221, a measurement unit 222, and a memory device 223. The memory 223 may store a plurality of software/firmware code or instructions executable by the processor 221 to maintain the operations of the communication apparatus. It is to be noted that the memory device 223 may also be configured outside of the baseband module 202 and the invention should not be limited thereto. The processor 221 executes code or the instructions stored in the memory 223 and controls the operations of the baseband module 202, the radio transceiver module 201, and the plugged subscriber identity card 203, respectively. The processor 221 may read data from the plugged subscriber identity card 203 and writes data to the plugged subscriber identity card 203. It is also to be noted that the communication apparatus 200 may also comprise other types of identity module instead of the subscriber identity card 203 and the invention should not be limited thereto.

The radio link(s) associated to one or more base station(s) forms an Active Set of the communication apparatus 200. The Active Set is a set of radio link(s) simultaneously involved in a specific communication service for the communication apparatus 200 in the wireless communication network. Generally, the communication apparatus 200 maintains a list of cells (i.e. the BSs) to monitor for potential handover purposes. The list of cells maintained by the communication apparatus 200 may include the cells in the Active Set, as well as adjacent cells which (although not in the Active Set) are to be monitored. The monitor procedure may be accomplished by the measurement unit 222 and the processor 221 as shown in FIG. 2. The measurement unit 222, which may be a hardware and/or firmware module, measures signal qualities of the cells in the cell lists. For example, measurement unit 222 may measure the received signal power to obtain the Received Signal Strength Indication (RSSI) values. The communication apparatus 200 continuously updates its list of cells to monitor based on information communicated to the communication apparatus 200 from the network. For example, the network may provide an initial list of cells via a message such as a MEASUREMENT CONTROL message. The initial list of cells may be, for example, a list of cells which neighbor the cell in which the communication apparatus 200 is located. The communication apparatus 200 reports its measurement results via a message such as a MEASUREMENT REPORT message. Thereafter the network may update the communication apparatus 200 regarding what cells should be included in the Active Set using a message such as an ACTIVE SET UPDATE message. The Active Set update may be triggered when at least one of the predetermined criteria is satisfied.

The communication apparatus 200 determines whether at least one of the predetermined criteria is satisfied according to some filtering operations. As defined by the 3GPP TS25.331 specification, the communication apparatus 200 receives a "Filter coefficient" and, depending on the measurement quantity, applies filtering of the measurements for that measurement quantity according to the following formula:

$$F_n = (1-a) \cdot F_{(n-1)} + a \cdot M_n \qquad \text{Eq. 1}$$

The variables in the formula are defined as follows: $F_n$ is the updated filtered measurement result, the $F_{(n-1)}$ is the old filtered measurement result, the $M_n$ is the latest received measurement result from physical layer measurements and the unit used for $M_n$ is the same unit as the reported unit in the MEASUREMENT REPORT message or the unit used in the event evaluation, and wherein $$a = \left(\frac{1}{2}\right)^{(k/2)}, \qquad \text{Eq. 2}$$

where k is the "Filter coefficient" parameter obtained from the MEASUREMENT CONTROL message. Generally, the filtering operations are accomplished by the Radio Resource Control (RRC) layer (also called the layer 3 (L3)) software/firmware module in the Baseband module 202 and may be executed by the processor 221. Thus, it is also called the "L3 filtering". After filtering the measurement results obtained by the measurement unit 222, the processor 221 may determine whether at least one of the predetermined criteria is satisfied, for an example, whether a filtered measurement result of a specific neighbor cell is greater than a predetermined threshold. When the criterion is continuously satisfied for a time to trigger (TTT) period, the processor 221 may send out an event-triggered MEASUREMENT REPORT message to the network (for example, to a system controller such as the network device 107). The system controller may further determine whether to add radio links in or to remove radio links from the Active Set according to the information carried in the MEASUREMENT REPORT message.

As defined by the 3GPP TS25.331 specification, the physical layer measurement results are sampled once every measurement period. The measurement period for intra frequency measurements, as defined by the 3GPP TS25.133 specification, is 200 ms. Based on this rule, in the conventional design, the measurement unit 222 measures the signal qualities of the cells in the list, and the processor 221 performs the L3 filtering once every measurement period. However, since the time resolution of measurement and L3 filtering is bound to 200 ms, unnecessary latency may occur. As an example, when the TTT period configured by the network is 640 ms, the processor 221 has to wait for 800 ms (200 ms*4) to cover the TTT period, which waste an extra 160 ms (800 ms−640 ms) to send out the event-triggered MEASUREMENT REPORT message, which deteriorates service quality; especially when the communication apparatus 200 is moving rapidly and across a border between two cells. Thus, in order to reduce active set update latency, a novel L3 filtering formula, which does not depart from the behavior of the original formula as shown in Eq. 1, with a finer time resolution is highly required.

Figure 3:
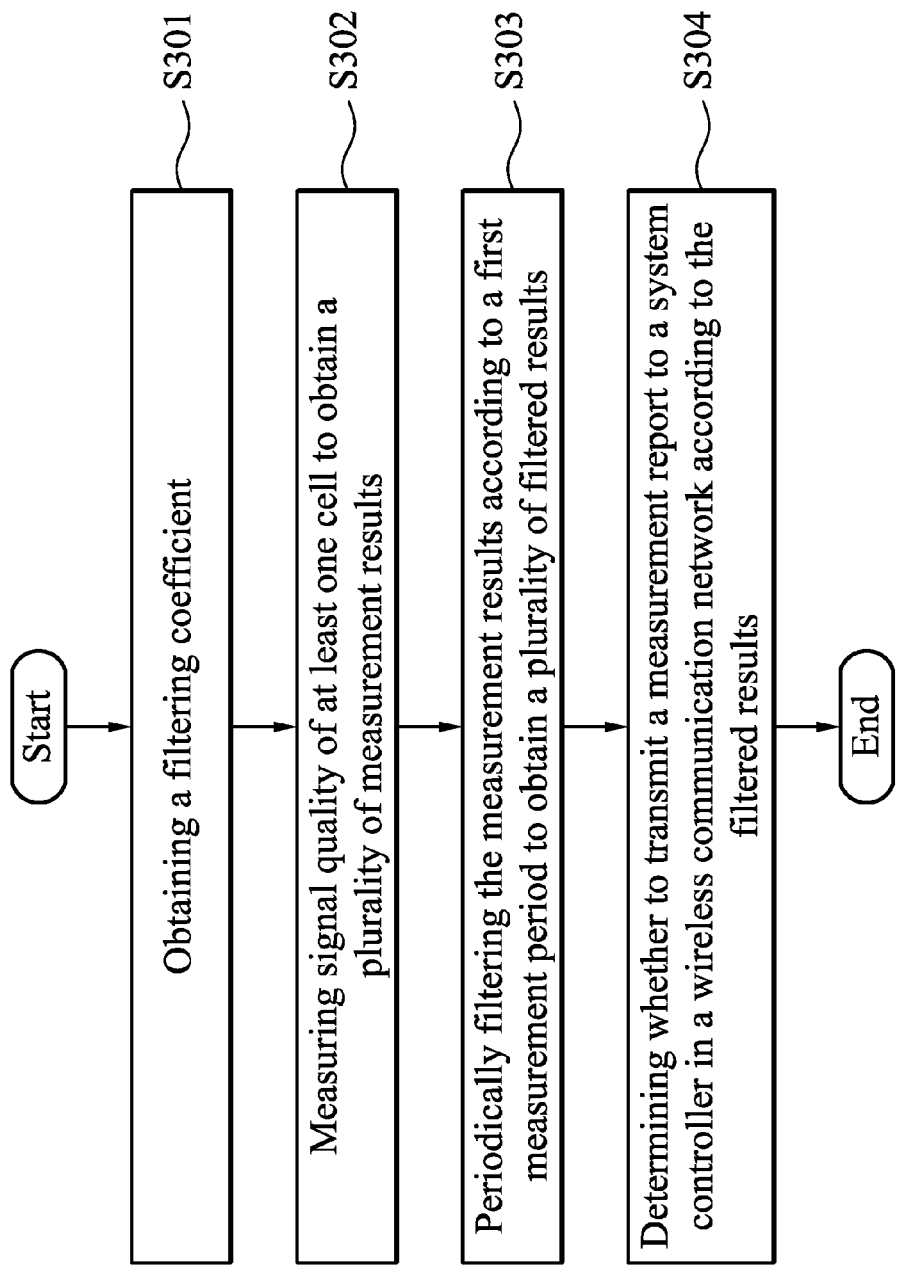
FIG. 3 shows a flow chart of a signal processing method according to an embodiment of the invention.

FIG. 3 shows a flow chart of a signal processing method according to an embodiment of the invention. After receiving the MEASUREMENT CONTROL message from the network (e.g. the system controller), the processor 221 of the communication apparatus 200 obtains the filtering coefficient a for L3 filtering (Step S301) and/or a list of cell to be monitored. The filtering coefficient a may be obtained according to the Filter Coefficient k, assigned by the network and carried in the MEASUREMENT CONTROL message, with reference to Eq. 2. Next, the processor 221 measures signal quality of at least one cell in the list to obtain a plurality of measurement results (Step S302). As previously described, the measurement may be accomplished by the measurement unit 222. Next, the processor 221 periodically performs L3 filtering to filter the measurement results according to a first measurement period to obtain a plurality of filtered results (Step S303). Finally, the processor 221 determines whether to transmit a measurement report to the system controller in a wireless communication network according to the filtered results (Step S304). The processor 221 transmits the measurement report to the BS or Node-B 101 or 102 when the filtered results satisfy at least one active set update criterion, as previously described. The filtering coefficient a assigned by the system controller is used to filter the measurement results obtained according to a predetermined measurement period. As defined by the specification, the predetermined measurement period is 200 ms. According to an embodiment of the invention, in order to reduce the Active Set update latency, the processor 221 performs cell measurement and L3 filtering according to the first measurement period shorter than the predetermined measurement period (the second measurement period). In this way, the L3 filter with finer time resolution is realized. Details of the proposed signal processing method will be discussed in the following paragraphs.

According to an embodiment of the invention, a value of the first measurement period may depend on a value of the predetermined measurement period (the second measurement period). As an example, when the predetermined measurement period is 200 ms, the possible choices of the first measurement period may be, as an example, a factor of 200, such as 100 ms, 50 ms, 40 ms, or other values. In order to introduce the proposed signal processing method more clearly, 50 ms is taken as an example of the first measurement period in the following paragraphs. According to an embodiment of the invention, the measurement unit 222 measures signal quality once every 50 ms to obtain a plurality of measurement values $S_0, S_1, S_2, S_3, S_4$ and so on. The measurement values may further be averaged to obtain a plurality of smoothed measurement results. The measurement results may be obtained according to a moving average of a current measurement value and at least one previous measurement value obtained within one of the predetermined measurement period according to the following exemplary formula:

$$M_a = \frac{\sum_{l=(a-(j-1))}^{a} S_l}{j}, \quad \text{Eq. 3}$$

wherein j is a quotient obtained by dividing a value of the predetermined measurement period into a value of the first measurement period. As an example, the measurement results may also be obtained once every 50 ms according to a current measurement value and the previous measurement values obtained within previous 200 ms as:

$$M_3 = \frac{S_0 + S_1 + S_2 + S_3}{4}, \quad \text{Eq. 4}$$

$$M_4 = \frac{S_1 + S_2 + S_3 + S_4}{4}, \quad \text{Eq. 5}$$

and so on.

It is noted that although 50 ms is utilized as an example, the invention should not be limited thereto. Those with ordinary skill in the art will appreciate that it is easy to modify the measuring operations to associate with different possible values of the first measurement period based upon the following descriptions.

After obtaining the measurement results, the processor 221 further filters the measurement results $M_3$ (an initial value for the 50 ms embodiment), $M_4$, $M_5$, $M_6$, and so on according to the proposed method. According to a first embodiment of the invention, the processor 221 may filter the measurement results according to a first predetermined algorithm expressed as:

$$F_{(i \times j)} = (1 - x_{(i \times j)})F_{(i \times j-1)} + x_{(i \times j)} \times M_{(i \times j)}, \quad \text{Eq. 6}$$

$$x_{(i \times j)} = a \times \frac{1}{j}$$

(i = 1, 2, 3, and so on), $$F_{(i \times j+1)} = (1 - x_{(i \times j+1)})F_{(i \times j-1)} + x_{(i \times j+1)} \times M_{(i \times j+1)}, \quad \text{Eq. 7}$$

$$x_{(i \times j+1)} = a \times \frac{2}{j},$$

to $$F_{(i \times j+(j-1))} = (1 - x_{(i \times j+(j-1))})F_{(i \times j-1)} + x_{(i \times j+(j-1))} \times M_{(i \times j+(j-1))}, \quad \text{Eq. 8}$$

$$x_{(i \times j+(j-1))} = a$$

where a is the filtering coefficient, $M_{(i \times j)}$, $M_{(i \times j+1)}$ to $M_{(i \times j+(j-1))}$ are the obtained measurement results, $F_{(i \times j-1)}$, $F_{(i \times j)}$ to $F_{(i \times j+(j-1))}$ are the filtering results obtained every first measurement period, i and j are positive integers, and wherein j is a quotient obtained by dividing a value of the second measurement period into a value of the first measurement period.

As an example, when the first measurement period is chosen as 50 ms, the value of integer j is obtained by 200/50=4. According to the 50 ms example, $F_3 = M_3$ (initialization) and Eq. 6 to Eq. 8 may be expressed as:

$$F_{(4 \times i)} = (1 - x_{(4 \times i)})F_{(4 \times i-1)} + x_{(4 \times i)} \times M_{(4 \times i)}, \quad \text{Eq. 9}$$

$$x_{(4 \times i)} = a \times \frac{1}{4}$$

(i = 1, 2, 3, and so on), $$F_{(4 \times i+1)} = (1 - x_{(4 \times i+1)})F_{(4 \times i-1)} + x_{(4 \times i+1)} \times M_{(4 \times i+1)}, \quad \text{Eq. 10}$$

$$x_{(4 \times i+1)} = a \times \frac{2}{4},$$

to $$F_{(4 \times i+3)} = (1 - x_{(4 \times i+3)})F_{(4 \times i-1)} + x_{(4 \times i+3)} \times M_{(4 \times i+3)}, \quad \text{Eq. 11}$$

$$x_{(4 \times i+3)} = a.$$

According to the embodiment of the invention, although the L3 filtering is performed more frequently (for example, once every 50 ms) than the predetermined measurement frequency (for example, once every 200 ms) as defined by the 3GPP specification, the filtering behavior on every 200 ms sample points remains unchanged. By comparing Eq. 11 with Eq. 1, it is shown that the proposed algorithm adheres to the 3GPP specification and a first filter loop bandwidth obtained by filtering the measurement results every first measurement period equals to a second filter loop bandwidth obtained by filtering the measurement results every the predetermined measurement period.

According to a second embodiment of the invention, the processor 221 may filter the measurement results according to a second predetermined algorithm expressed as:

$$F_{(i \times j)} = \left(1 - a \times \frac{1}{j}\right) F_{(i \times j-1)} + a \times \frac{S_{(i \times j)}}{j} \qquad \text{Eq. 12}$$

$(i = 1, 2, 3, \text{ and so on}),$ $$F_{(i \times j+1)} = \left(1 - a \times \frac{2}{j}\right) F_{(i \times j-1)} + a \times \frac{(S_{(i \times j)} + S_{(i \times j+1)})}{j}, \qquad \text{Eq. 13}$$

$$F_{(i \times j + (j-1))} = \qquad \text{Eq. 14}$$
$$(1-a) F_{(i \times j-1)} + a \times \frac{(S_{(i \times j)} + S_{(i \times j+1)} + \ldots S_{(i \times j + (j-1))})}{j},$$

to
where a is the filtering coefficient, $S_{(i \times j)}$, $S_{(i \times j+1)}$ to $S_{(i \times j+(j-1))}$ are a plurality of measurement values of the signal quality obtained according to the first measurement period, $F_{(i \times j-1)}$, $F_{(i \times j)}$ to $F_{(i \times j+(j-1))}$ are the filtering results obtained every first measurement period, i and j are positive integers, and wherein j is a quotient obtained by dividing a value of the second measurement period into a value of the first measurement period.

As an example, when the first measurement period is chosen as 50 ms, the value of integer j is obtained by 200/50=4. According to the 50 ms example, $F_3 = M_3$ (initialization) and Eq. 12 to Eq. 14 may be expressed as:

$$F_{(4 \times i)} = \left(1 - a \times \frac{1}{4}\right) F_{(4 \times i-1)} + a \times \frac{S_{(4 \times i)}}{4} \qquad \text{Eq. 15}$$

$(i = 1, 2, 3, \text{ and so on}),$ $$F_{(4 \times i+1)} = \left(1 - a \times \frac{2}{4}\right) F_{(4 \times i-1)} + a \times \frac{(S_{(4 \times i)} + S_{(4 \times i+1)})}{4}, \qquad \text{Eq. 16}$$

to $$F_{(4 \times i+3)} = \qquad \text{Eq. 17}$$
$$(1-a) F_{(4 \times i-1)} + a \times \frac{(S_{(4 \times i)} + S_{(4 \times i+1)} + \ldots S_{(4 \times i+3)})}{4}.$$

According to the embodiment of the invention, although the L3 filtering is performed more frequently (for example, once every 50 ms) than the predetermined measurement frequency (for example, once every 200 ms) as defined by the 3GPP specification, the filtering behavior on every 200 ms sample points remains unchanged. By comparing Eq. 17 with Eq. 1, it is shown that the proposed algorithm adheres to the 3GPP specification and a first filter loop bandwidth obtained by filtering the measurement results every first measurement period equals to a second filter loop bandwidth obtained by filtering the measurement results every predetermined measurement period.

According to a third embodiment of the invention, processor may filter the measurement results according to a third predetermined algorithm expressed as:

$$F_{(i \times j)} = (1-a) F_{((i-1) \times j)} + a \times M_{(i \times j)} (i=1,2,3, \text{ and so on}) \qquad \text{Eq. 18,}$$

$$F_{(i \times j+1)} = (1-a) F_{((i-1) \times j+1)} + a \times M_{(i \times j+1)} \qquad \text{Eq. 19,}$$

to $$F_{(i \times j+(j-1))} = (1-a) F_{((i-1) \times j+(j-1))} + a \times M_{(i \times j+(j-1))} \qquad \text{Eq. 20,}$$

where $F_0 = M_0$, $F_1 = M_1$, $F_2 = M_2$, $F_3 = M_3$ for initialization, a is the filtering coefficient, $M_{(i \times j)}$, $M_{(i \times j+1)}$, ... $M_{(i \times j+(j-1))}$ are the measurement results obtained according to the first measurement period, $F_{((i-1) \times j)}$ to $F_{(i \times j-1)}$, $F_{(i \times j)}$ to $F_{(i \times j+(j-1))}$ are the filtering results obtained according to the first measurement period, i and j are positive integers, and wherein j is a quotient obtained by dividing a value of the second measurement period into a value of the first measurement period.

As an example, when the first measurement period is chosen as 50 ms, the value of integer j is obtained by 200/50=4. According to the embodiment of the invention, although the L3 filtering is performed more frequently (for example, once every 50 ms) than the predetermined measurement frequency (for example, once every 200 ms) as defined by the 3GPP specification, the filtering behavior on every 200 ms sample points remains unchanged. By comparing Eq. 18, to Eq. 20 with Eq. 1, it is shown that the proposed algorithm adheres to the 3GPP specification and a first filter loop bandwidth obtained by filtering the measurement results every first measurement period equals to a second filter loop bandwidth obtained by filtering the measurement results every predetermined measurement period.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus having a radio transceiver module, comprising:
    a processor receiving a measurement control message carrying information about a filtering coefficient via the radio transceiver module, periodically measuring signal quality of at least one cell to obtain a plurality of measurement results and filtering the measurement results to obtain a plurality of filtered results every a first measurement period, and determining whether to transmit a measurement report to a system controller in the wireless communication network according to the filtered results,
    wherein the filtering coefficient is assigned by the system controller to filter the measurement results, and wherein the first measurement period is shorter than a second measurement period predefined in specification.

2. The communication apparatus as claimed in claim 1, wherein a value of the first measurement period depends on a value of the second measurement period.

3. The communication apparatus as claimed in claim 1, wherein the processor transmits the measurement report to the system controller when the filtered results satisfies at least one active set update criterion.

4. The communication apparatus as claimed in claim 1, wherein each measurement result is a moving average of a current measurement value and at least one previous measurement value, and wherein the measurement values are signal quality sampled once every first measurement period.

5. The communication apparatus as claimed in claim 1, wherein a first filter loop bandwidth obtained by filtering the measurement results every the first measurement period equals to a second filter loop bandwidth obtained by filtering the measurement results every the second measurement period.

6. The communication apparatus as claimed in claim 1, wherein the processor filters the measurement results according to an algorithm expressed as:

$$F_{i \times j} = (1 - x_{i \times j})F_{i \times j-1} + x_{i \times j} \times M_{i \times j},$$

$$x_{i \times j} = a \times \frac{1}{j};$$

$$F_{i \times j+1} = (1 - x_{i \times j+1})F_{i \times j-1} + x_{i \times j+1} \times M_{i \times j+1},$$

$$x_{i \times j+1} = a \times \frac{2}{j};$$

to $$F_{i \times j+(j-1)} = (1 - x_{i \times j+(j-1)})F_{i \times j-1} + x_{i \times j+(j-1)} \times M_{i \times j+(j-1)},$$

$$x_{i \times j+(j-1)} = a,$$

where a is the filtering coefficient, $x_{i \times j}$, $x_{i \times j+1}$, $x_{i \times j+(j-1)}$ are multiples of (1/j) times the filtering coefficient a, $M_{i \times j}$, $M_{i \times j+1}$ to $M_{i \times j+(j-1)}$ are the measurement results obtained according to the first measurement period, , $F_{i \times j-1}$, $F_{i \times j}$ to $F_{i \times j+(j-1)}$ are the filtering results obtained according to the first measurement period, i and j are positive integers, and wherein j is a quotient obtained by dividing a value of the second measurement period into a value of the first measurement period.

7. The communication apparatus as claimed in claim 1, wherein the processor filters the measurement results according to an algorithm expressed as:

$$F_{i \times j} = \left(1 - a \times \frac{1}{j}\right)F_{i \times j-1} + a \times \frac{S_{i \times j}}{j};$$

$$F_{i \times j+1} = \left(1 - a \times \frac{2}{j}\right)F_{i \times j-1} + a \times \frac{(S_{i \times j} + S_{i \times j+1})}{j};$$

to $$F_{i \times j+(j-1)} = (1 - a)F_{i \times j-1} + a \times \frac{(S_{i \times j} + S_{i \times j+1} + \ldots S_{i \times j+(j-1)})}{j},$$

where a is the filtering coefficient, $S_{i \times j}$, $S_{i \times j+1}$ to $S_{i \times j+(j-1)}$ are a plurality of measurement values of the signal quality obtained according to the first measurement period, $F_{i \times j-1}$, $F_{i \times j}$ to $F_{i \times j+(j-1)}$ are the filtering results, i and j are positive integers, and wherein j is a quotient obtained by dividing a value of the second measurement period into a value of the first measurement period.

8. The communication apparatus as claimed in claim 1, wherein the processor filters the measurement results according to an algorithm expressed as:

$$F_{i \times j} = (1-a)F_{(i-1) \times j} + a \times M_{i \times j};$$

$$F_{i \times j+1} = (1-a)F_{(i-1) \times j+1} + a \times M_{i \times j+1}; \text{ to}$$

$$F_{i \times j+(j-1)} = (1-a)F_{(i-1) \times j+(j-1)} + a \times M_{i \times j+(j-1)},$$

where a is the filtering coefficient, $M_{i \times j}$, $M_{i \times j+1}$ to $M_{i \times j+(j-1)}$ are the measurement results obtained according to the first measurement period, $F_{(i-1) \times j}$ to $F_{i \times j-1}$, $F_{i \times j}$ to $F_{i \times j+(j-1)}$ are the filtering results obtained according to the first measurement period, i and j are positive integers, and wherein j is a quotient obtained by dividing a value of the second measurement period into a value of the first measurement period.

9. A signal processing method, comprising:
obtaining a filtering coefficient;
periodically measuring signal quality of at least one cell to obtain a plurality of measurement results;
periodically filtering the measurement results according to a first measurement period to obtain a plurality of filtered results; and
determining whether to transmit a measurement report to a system controller in a wireless communication network according to the filtered results,
wherein the filtering coefficient is assigned by the system controller to filter the measurement results according to a second measurement period, and wherein the second measurement period is longer than the first measurement period.

10. The method as claimed in claim 9, wherein a value of the first measurement period depends on a value of the second measurement period.

11. The method as claimed in claim 9, wherein the measurement report is transmitted to the system controller when the filtered results satisfies at least one active set update criterion.

12. The method as claimed in claim 9, wherein each measurement result is a moving average of a current measurement value and at least one previous measurement value, and wherein the measurement values are signal quality sampled once every first measurement period.

13. The method as claimed in claim 9, wherein a first filter loop bandwidth obtained by filtering the measurement results every the first measurement period equals to a second filter loop bandwidth obtained by filtering the measurement results every the second measurement period.

14. The method as claimed in claim 9, wherein the processor filters the measurement results according to an algorithm expressed as:

$$F_{i \times j} = (1 - x_{i \times j})F_{i \times j-1} + x_{i \times j} \times M_{i \times j},$$

$$x_{i \times j} = a \times \frac{1}{j};$$

$$F_{i \times j+1} = (1 - x_{i \times j+1})F_{i \times j-1} + x_{i \times j+1} \times M_{i \times j+1},$$

$$x_{i \times j+1} = a \times \frac{2}{j};$$

to $$F_{i \times j+(j-1)} = (1 - x_{i \times j+(j-1)})F_{i \times j-1} + x_{i \times j+(j-1)} \times M_{i \times j+(j-1)},$$

$$x_{i \times j+(j-1)} = a,$$

where a is the filtering coefficient, $x_{i \times j}$, $x_{i \times j+1}$, $x_{i \times j+(j-1)}$ are multiples of (1/j) times the filtering coefficient a, $M_{i \times j}$, $M_{i \times j+1}$ to $M_{i \times j+(j-1)}$ are the measurement results obtained according to the first measurement period, $F_{i \times j-1}$, $F_{i \times j}$ to $F_{i \times j+(j-1)}$ are the filtering results obtained according to the first measurement period, i and j are positive integers, and wherein j is a quotient obtained by dividing a value of the second measurement period into a value of the first measurement period.

15. The method as claimed in claim 9, wherein the processor filters the measurement results according to an algorithm expressed as:

$$F_{i \times j} = \left(1 - a \times \frac{1}{j}\right)F_{i \times j-1} + a \times \frac{S_{i \times j}}{j};$$

$$F_{i \times j+1} = \left(1 - a \times \frac{2}{j}\right)F_{i \times j-1} + a \times \frac{(S_{i \times j} + S_{i \times j+1})}{j};$$

to $$F_{i \times j+(j-1)} = (1 - a)F_{i \times j-1} + a \times \frac{(S_{i \times j} + S_{i \times j+1} + \ldots S_{i \times j+(j-1)})}{j},$$

where a is the filtering coefficient, $S_{i \times j}$, $S_{i \times j+1}$ to $S_{i \times j+(j-1)}$ are a plurality of measurement values of the signal quality obtained according to the first measurement period, $F_{i \times j-1}$, $F_{i \times j}$ to $F_{i \times j+(j-1)}$ are the filtering results, i and j are positive integers, and wherein j is a quotient obtained by dividing a value of the second measurement period into a value of the first measurement period.

16. The method as claimed in claim 9, wherein the processor filters the measurement results according to an algorithm expressed as:

$$F_{i \times j} = (1-a)F_{(i-1) \times j} + a \times M_{i \times j};$$

$$F_{i \times j+1} = (1-a)F_{(i-1) \times j+1} + a \times M_{i \times j+1}; \text{ to}$$

$$F_{i \times j+(j-1)} = (1-a)F_{(i-1) \times j+(j-1)} + a \times M_{i \times j+(j-1)},$$

where a is the filtering coefficient, $M_{i \times j}$, $M_{i \times j+1}$ to $M_{i \times j+(j-1)}$ are the measurement results obtained according to the first measurement period, $F_{(i-1) \times j}$ to $F_{i \times j-1}$, to $F_{i \times j+(j-1)}$ are the filtering results obtained according to the first measurement period, i and j are positive integers, and wherein j is a quotient obtained by dividing a value of the second measurement period into a value of the first measurement period.

17. A communication apparatus including a radio transceiver module, comprising:
   a processor configured to receive a measurement control message carrying information about a filtering coefficient via the radio transceiver module, the processor further configured to periodically measure signal quality of at least one cell to obtain a plurality of measurement results, periodically filter the measurement results according to a first measurement period to obtain a plurality of filtered results, and transmit a measurement report to a system controller according to the filtered results,
   wherein the filtering coefficient is assigned by the system controller to filter the measurement results according to a second measurement period, and
   wherein the second measurement period is longer than the first measurement period.

* * * * *